F. C. RICHARDSON.
Improvement in Hair-Clipping Devices.
No. 114,477. Patented May 2, 1871.
Fig. 1.
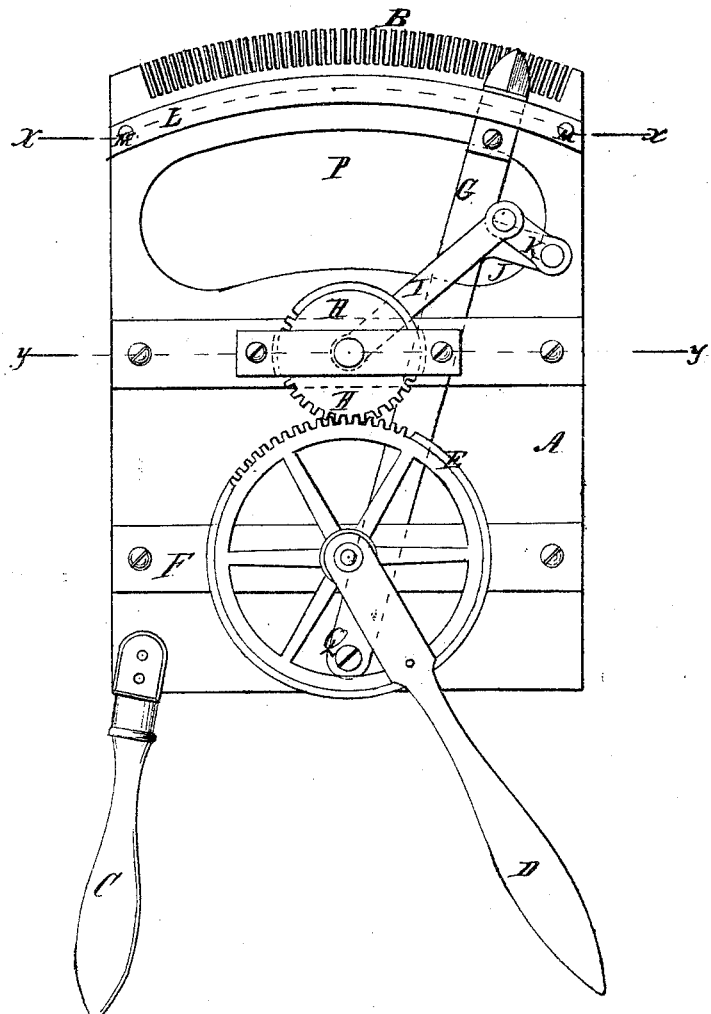
Fig. 2.
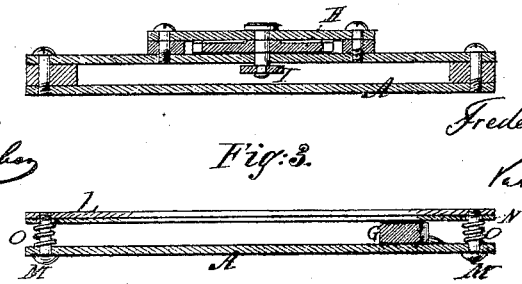
Fig. 3.
Witnesses:
C. Wahlers.
E. F. Kastenhuber
Inventor:
Frederick Chr. Richardson
per
Van Santvoord & Hauff
Attys

United States Patent Office.

FREDERICK CHARLES RICHARDSON, OF NEW YORK, N. Y., ASSIGNOR TO HIMSELF AND WILLIAM HELLINS, OF HUDSON CITY, NEW JERSEY.

Letters Patent No. 114,477, dated May 2, 1871; antedated April 27, 1871.

IMPROVEMENT IN HAIR-CLIPPING DEVICES.

The Schedule referred to in these Letters Patent and making part of the same.

*To all whom it may concern:*

Be it known that I, FREDERICK CHARLES RICHARDSON, of the city, county, and State of New York, have invented a new and useful Improvement in Clipping-Machines; and I do hereby declare the following to be a full, clear, and exact description thereof, which will enable those skilled in the art to make and use the same, reference being had to the accompanying drawing forming part of this specification, in which drawing—

Figure 1 is a plan view of my improvement, the gearing being exposed to view.

Figure 2 is a transverse section taken in the plane of the line x x, fig. 1.

Figure 3 is a section in the line y y, fig. 1.

Similar letters indicate corresponding parts.

This invention relates to that class of devices known as shears for clipping the hair of horses or other animals; and It consists of a certain combination, construction, and arrangement of parts, as will hereinafter more fully be described.

The letter A in the drawing designates a plate which, when operating the instrument, rests upon the skin of the animal.

The front end of the plate A terminates in a series of teeth, B, extending across the width of the plate, and which are intended to receive between them the hairs of the coating of the animal.

In this example the teeth B are parallel with each other, but they may be serrated like saw-teeth when my instrument is to be used for clipping sheep and other animals having thick and heavy coatings.

The implement is supported, while being operated, by means of a handle, C, and the cutter is operated by means of a lever, D, as follows:

Said lever D is fixed to the shaft of a large toothed wheel, E, which is supported by a cross-bar, F, which extends across plate A, and is connected thereto by its ends in such a manner that the cutter G can move freely beneath it.

The toothed wheel E engages a smaller toothed wheel, H, which is supported above the surface of plate A in like manner, and from shaft of said wheel H extends an arm or lever, I, which is connected to the arm J of the cutter by means of a link, K, whose ends are pivoted to the arms I J.

The end of the cutter G is sharpened on both sides, and it extends to the further end of the plate, so that it can be moved to and fro over the teeth B.

The end of the cutter is held down to the teeth and confined in its proper place by means of an elevated cross-bar, L, whose ends are supported on the plate A by screws, M M, working through the bottom of the plate, by means of which screws the cross-bar can be adjusted to and from the plate.

Under the cross-bar L, I provide a loose spring wearing-bar, N, with which the cutter comes in contact, and which consequently receives wear from the movements of the cutter and saves the rigid cross-bar L.

The ends of the spring bar N are perforated to let the screws M M pass through them, and around the shanks of the screws I coil springs O O, which rest on plate A and support the loose bar N and press it up against the rigid bar L. When the bar N is worn it can be replaced by a fresh one.

I provide in the plate A, behind the series of teeth B, an opening, P, for the discharge and escape of the clippings which are removed by the cutter, so that the cutter and other parts will not be liable to become clogged by them.

The cutter G is pivoted to the plate A by a pivot, Q, and it is arranged next the plate and beneath the driving mechanism.

What I claim as new, and desire to secure by Letters Patent, is—

1. The plate N, supported by the springs O O against the cross-bar L, arranged upon the shanks of the screws M M, substantially as and for the purpose described.

2. The toothed wheel E mounted upon the bar F and operated by the lever D, in combination with the wheel H, bar I, connected to the arm J of the cutter G by the link K, when said cutter freely slides between the cross-bar F and the plate A, as herein shown and described.

F. C. RICHARDSON.

Witnesses:
E. F. BILHUBER,
E. F. KASTENHUBER.